United States Patent
Maat et al.

(10) Patent No.: US 8,780,506 B1
(45) Date of Patent: Jul. 15, 2014

(54) CURRENT-PERPENDICULAR-TO-THE-PLANE (CPP) MAGNETORESISTIVE (MR) SENSOR WITH SIDE SHIELDS AND AN ANTIPARALLEL STRUCTURE TOP SHIELD

(71) Applicant: HGST Netherlands B.V., Amsterdam (NL)

(72) Inventors: Stefan Maat, San Jose, CA (US); Alexander M. Zeltser, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/922,972

(22) Filed: Jun. 20, 2013

(51) Int. Cl.
G11B 5/39 (2006.01)

(52) U.S. Cl.
USPC ......................................................... 360/319

(58) Field of Classification Search
CPC ........................................................ G11B 5/39
USPC .......... 360/319, 324.1, 324.11, 324.12, 324.2
See application file for complete search history.

(56) References Cited

U.S. PATENT DOCUMENTS

| | | | |
|---|---|---|---|
| 6,456,467 B1 | 9/2002 | Mao et al. | |
| 6,556,392 B1 | 4/2003 | Mao | |
| 6,801,409 B2 | 10/2004 | Michel et al. | |
| 7,158,351 B2 * | 1/2007 | Nakamoto et al. | 360/319 |
| 7,248,449 B1 | 7/2007 | Seagle | |
| 7,333,304 B2 | 2/2008 | Gill | |
| 7,397,637 B2 | 7/2008 | Gill | |
| 7,495,867 B2 | 2/2009 | Sbiaa | |
| 7,599,154 B2 | 10/2009 | Sbiaa | |
| 7,800,867 B2 | 9/2010 | Saito et al. | |
| 8,125,746 B2 | 2/2012 | Dimitrov | |
| 8,576,518 B1 * | 11/2013 | Zeltser et al. | 360/319 |
| 2009/0279213 A1 | 11/2009 | Wu et al. | |
| 2011/0051291 A1 | 3/2011 | Miyauchi et al. | |
| 2012/0087046 A1 * | 4/2012 | Yanagisawa et al. | 360/294 |
| 2012/0154955 A1 | 6/2012 | Tsoukatos | |
| 2012/0250189 A1 * | 10/2012 | Degawa et al. | 360/235.4 |

OTHER PUBLICATIONS

Haginoya et al., "Side-Shielded Tunneling Magnetoresistive Read Head for High-Density Recording", IEEE Transactions on Magnetics, vol. 40, No. 4, Jul. 2004, pp. 2221-2223.

Hatatani et al., "Properties of Side-Shielded Read Heads in Longitudinal and Perpendicular Recording", IEEE Transactions on Magnetics, vol. 41, No. 11, Nov. 2005, pp. 4347-4350.

Zheng et al., "Side Shielded TMR Reader With Track-Width-Reduction Scheme", IEEE Transactions on Magnetics, vol. 42, No. 10, Oct. 2006, pp. 2303-2305.

* cited by examiner

*Primary Examiner* — Angel Castro
(74) *Attorney, Agent, or Firm* — Thomas R. Berthold (57) ABSTRACT

A current-perpendicular-to-the-plane (CPP) magnetoresistive (MR) sensor has both side shields and an antiparallel structure (APS) top shield. The APS top shield is an antiferromagnetically exchange-coupled top shield that includes an antiparallel (AP) coupled structure and an antiferromagnetic (AF) layer which permits the use of the desired NiFe$_x$ (x is between 15 and 25 atomic percent) material for the side shields. The APS top shield includes lower and upper ferromagnetic layers with respective antiparallel magnetizations. The antiparallel coupling structure between the two ferromagnetic layers consists of the antiparallel coupling (APC) film, which is typically Ru, Ir or Cr, and one and only one interface film of Co or CoFe. The APS top shield with one and only one Co or CoFe interface film enables the material of the side shields to be formed of the preferred NiFe$_x$ (x is between 15 and 25 atomic percent) material without over-stabilization of the free layer.

22 Claims, 7 Drawing Sheets

CURRENT-PERPENDICULAR-TO-THE-PLANE (CPP) MAGNETORESISTIVE (MR) SENSOR WITH SIDE SHIELDS AND AN ANTIPARALLEL STRUCTURE TOP SHIELD

BACKGROUND OF THE INVENTION

1. Field of the Invention

The invention relates generally to a current-perpendicular-to-the-plane (CPP) magnetoresistive (MR) sensor that operates with the sense current directed perpendicularly to the planes of the layers making up the sensor stack, and more particularly to a CPP-MR sensor with side shields.

2. Background of the Invention

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu). One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the free layer. With a sense current applied to the sensor, the rotation of the free-layer magnetization relative to the reference-layer magnetization due to the presence of an external magnetic field is detectable as a change in electrical resistance. If the sense current is directed perpendicularly through the planes of the layers in the sensor stack, the sensor is referred to as a current-perpendicular-to-the-plane (CPP) sensor.

In addition to CPP-GMR read heads, another type of CPP-MR sensor is a magnetic tunnel junction sensor, also called a tunneling MR or TMR sensor, in which the nonmagnetic spacer layer is a very thin nonmagnetic tunnel barrier layer. In a CPP-TMR sensor the tunneling current perpendicularly through the layers depends on the relative orientation of the magnetizations in the free and reference ferromagnetic layers. In a CPP-GMR read head the nonmagnetic spacer layer is formed of an electrically conductive material, typically a metal such as Cu. In a CPP-TMR read head the nonmagnetic spacer layer is formed of an electrically insulating material, such as $TiO_2$, $MgO$, or $Al_2O_3$.

The sensor stack in a CPP-MR read head has an edge that faces the disk with a width referred to as the track width (TW). The sensor stack has a back edge recessed from the edge that faces the disk, with the dimension from the disk-facing edge to the back edge referred to as the stripe height (SH). The sensor stack is generally surrounded at the TW edges and back edge by insulating material. A layer of hard magnetic material is used to bias or stabilize the magnetization of the free layer and is deposited on both sides of the sensor onto insulating material on each side of the TW edges. As the data density increases in magnetic recording disk drives, there is a requirement for a decrease in the read head dimensions, more particularly the TW. However, the effective or "magnetic" TW does not decrease linearly with a decrease in the physical TW because of side reading of data bits from adjacent tracks. To overcome this problem, side shields of soft magnetically permeable material located on the sides of the sensor have been proposed to absorb magnetic flux from data bits in adjacent tracks. The side shields require that the soft magnetic material be located on the sides of the free layer at the TW edges, which means that the hard magnetic biasing material must be removed. This requires the use of an alternative technique to maintain magnetic stabilization of the free layer.

The sensor stack in a CPP-MR read head is located between two along-the-track top and bottom shields of soft magnetically permeable material that shield the read head from recorded data bits along the track that are neighboring the data bit being read. As the read head dimensions decrease, there is an increasing need to shield the sensor from flux from the neighboring bits in the along-the-track direction as well as from bits in adjacent tracks to improve the spatial resolution of the sensor. During a read operation, the top and bottom shields ensure that the sensor reads only the information from the bit stored directly beneath it on a specific track of the disk by absorbing any stray magnetic fields emanating from adjacent bits and adjacent tracks. In each shield there can be a large number of magnetic domains separated from each other by domain walls. The application of an external magnetic field, such as from bits in adjacent tracks or adjacent bits in the track being read, can cause these magnetic domain walls to move. The overall result is undesirable noise during the read operation.

What is needed is a CPP-MR sensor with side shields that also maintain magnetic stabilization of the free layer and with along-the-track top and bottom shields that reduce noise during a read operation.

SUMMARY OF THE INVENTION

Embodiments of the invention relate to a current-perpendicular-to-the-plane (CPP) magnetoresistive (MR) sensor that has both side shields and an antiparallel structure (APS) top shield. The APS top shield is an antiferromagnetically exchange-coupled top shield that includes an antiparallel (AP) coupled structure and an antiferromagnetic (AF) layer that permits the use of the desired $NiFe_x$ (x is between 15 and 25 atomic percent) material for the side shields. The APS top shield includes lower and upper ferromagnetic layers with respective antiparallel magnetizations. The antiparallel coupling structure between the two ferromagnetic layers consists of the antiparallel coupling (APC) film, which is typically Ru, Ir or Cr, and one and only one interface film of Co or CoFe. The APS top shield with one and only one Co or CoFe interface film enables the material of the side shields to be formed of the preferred $NiFe_x$ (x is between 15 and 25 atomic percent) material without over-stabilization of the free layer. That is, the APS top shield prevents the preferred-material side shields from providing too strong of a biasing field to the free layer, which would prevent the free layer magnetization from properly rotating in the presence of magnetic fields from the recorded data on the disk.

For a fuller understanding of the nature and advantages of the present invention, reference should be made to the following detailed description taken together with the accompanying figures.

DETAILED DESCRIPTION OF THE INVENTION

Figure 1:
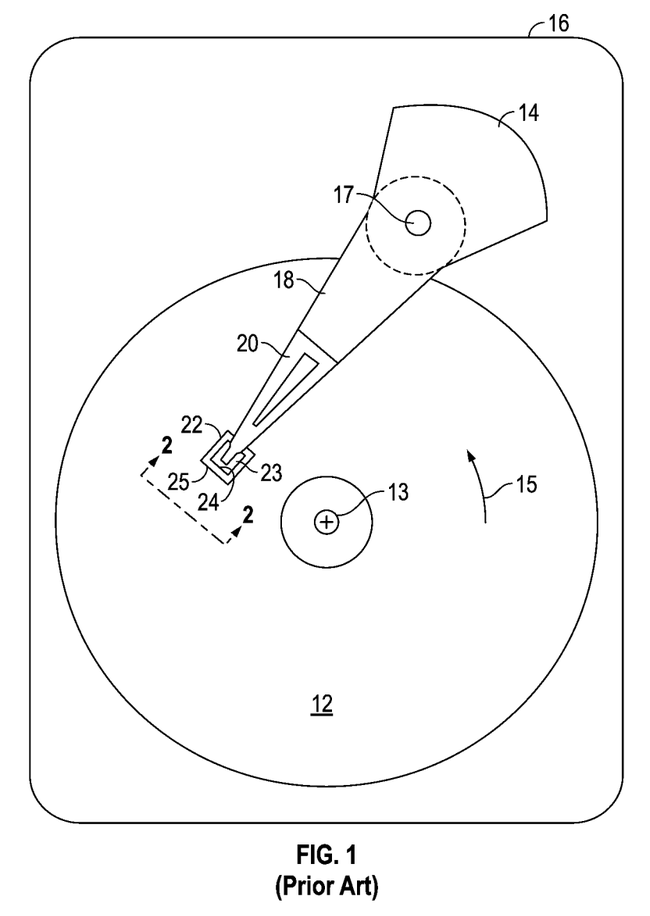
FIG. 1 is a schematic top view of a conventional magnetic recording hard disk drive with the cover removed.

The CPP magnetoresistive (MR) sensor of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
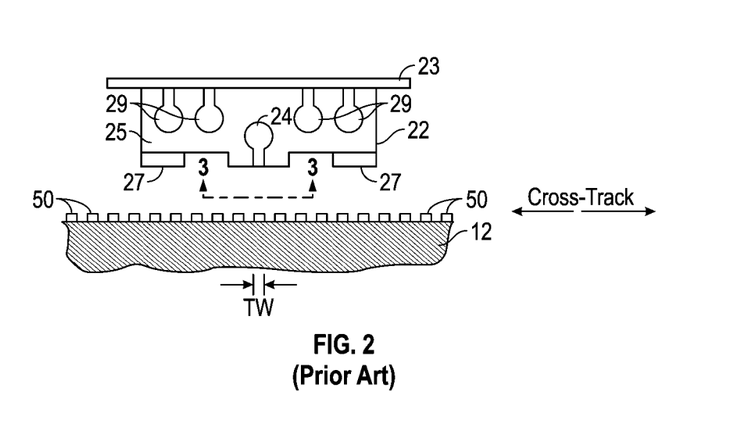
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric magnetic data tracks with track width TW are created when the write head writes on the continuous recording layer.

Figure 3:
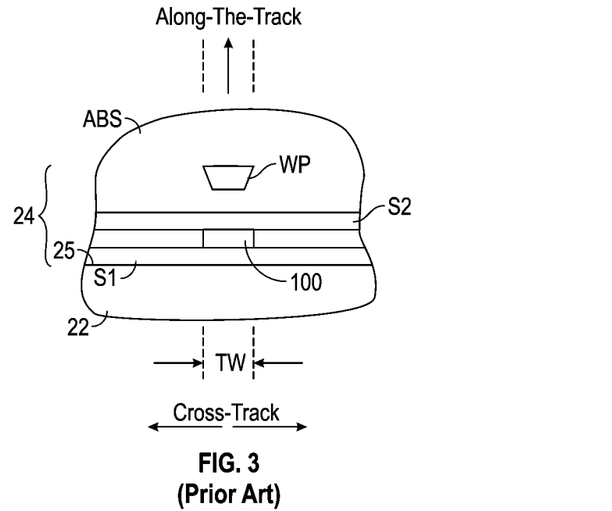
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The CPP-MR sensor or read head 100 is located between two magnetic shields S1 and S2. The shields S1, S2 are formed of soft magnetically permeable material, typically a NiFe alloy, and may also be electrically conductive so they can function as the electrical leads to the read head 100. The shields function to shield the read head 100 from recorded data bits in the along-the-track direction that are neighboring the data bit being read. Separate electrical leads may also be used, in which case the read head 100 is formed in contact with layers of electrically conducting lead material, such as tantalum, gold, or copper, that are in contact with the shields S1, S2. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4:
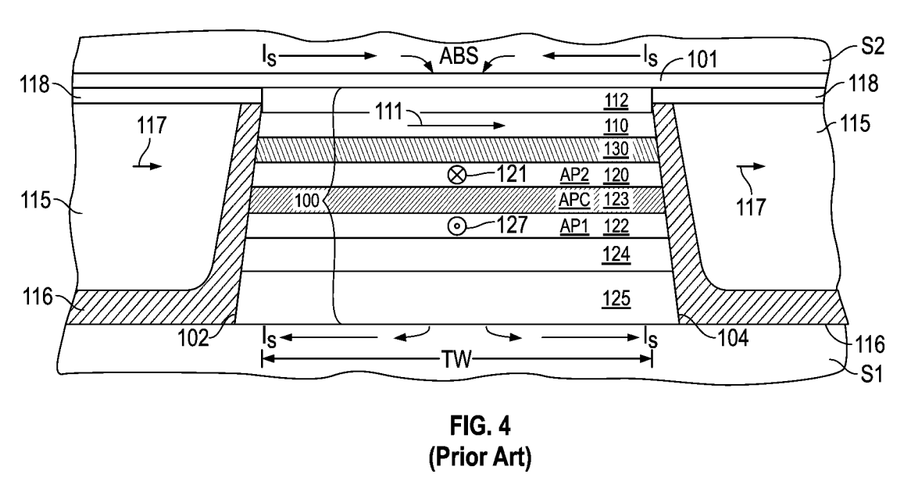
FIG. 4 is a cross-sectional schematic view of a conventional CPP-MR read head showing the stack of layers located between the along-the-track magnetic shield layers.

FIG. 4 is view of the ABS showing the layers making up a conventional CPP-MR sensor structure as would be viewed from the disk. Sensor 100 is a CPP-MR read head comprising a stack of layers formed between the two magnetic shield layers S1, S2. The sensor 100 has a front edge at the ABS and spaced-apart side edges 102, 104. The shields S1, S2 are formed of an electrically conductive magnetic material and thus may also function as electrical leads for the sense current $I_S$, which is directed generally perpendicularly through the layers in the sensor stack. Alternatively, separate electrical lead layers may be formed between the shields S1, S2 and the sensor stack. The lower shield S1 is typically polished by chemical-mechanical polishing (CMP) to provide a smooth substrate for the growth of the sensor stack. A seed layer 101, such as a thin Ru/NiFe bilayer, is deposited, typically by sputtering, below S2 to facilitate the electroplating of the relatively thick S2. The Ru layer is used to adjust the magnetic read gap and the NiFe layer functions as the plating seed for S2, which typically also is a NiFe alloy such as permalloy.

The sensor 100 layers include a reference ferromagnetic layer 120 having a fixed magnetic moment or magnetization direction 121 oriented transversely (into the page), a free ferromagnetic layer 110 having a magnetic moment or magnetization direction 111 that can rotate in the plane of layer 110 in response to transverse external magnetic fields from the disk 12, and a nonmagnetic spacer layer 130 between the reference layer 120 and free layer 110. The width of the free layer 110 essentially defines the sensor's physical track width (TW). The CPP-MR sensor 100 may be a CPP-GMR sensor, in which case the nonmagnetic spacer layer 130 would be formed of an electrically conducting material, typically a metal like Cu, Au or Ag. Alternatively, the CPP-MR sensor 100 may be a CPP tunneling MR (CPP-TMR) sensor, in which case the nonmagnetic spacer layer 130 would be a tunnel barrier formed of an electrically insulating material, like $TiO_2$, MgO, or $Al_2O_3$.

The pinned ferromagnetic layer in a CPP-MR sensor may be a single pinned layer (also called a "simple" pinned layer) or an antiparallel (AP) pinned structure like that shown in FIG. 4. The pinned layer in the CPP-GMR sensor in FIG. 4 is a well-known AP-pinned structure with reference ferromagnetic layer 120 (AP2) and a lower ferromagnetic layer 122 (AP1) that are antiferromagnetically coupled across an AP coupling (APC) layer 123. The APC layer 123 is typically Ru, Ir, Rh, Cr or alloys thereof. The AP1 and AP2 layers, as well as the free ferromagnetic layer 110, are typically formed of crystalline CoFeB, CoFe or NiFe alloys, or a multilayer of these materials, such as a CoFe/NiFe bilayer. The AP1 and AP2 ferromagnetic layers have their respective magnetization directions 127, 121 oriented antiparallel. The AP1 layer 122 may have its magnetization direction pinned by being exchange-coupled to an antiferromagnetic (AF) layer 124 as shown in FIG. 4. The AF layer 124 is typically a Mn alloy, e.g., PtMn, NiMn, FeMn, IrMn, PdMn, PtPdMn, or RhMn. It is desirable that the AP1 and AP2 layers have similar moments. This assures that the net magnetic moment of the AP-pinned structure is small so that magnetostatic coupling to the free layer 110 is minimized and the effective pinning field of the AF layer 124, which is approximately inversely proportional to the net magnetization of the AP-pinned structure, remains high.

A seed layer 125 may be located between the lower shield layer S1 and the AP-pinned structure to enhance the growth of the AF layer 124. The seed layer 125 is typically one or more layers of NiFeCr, NiFe, Ta, Cu or Ru. A capping layer 112 is located between the free ferromagnetic layer 110 and the upper shield layer S2. The capping layer 112 provides corrosion protection and may be a single layer or multiple layers of different materials, such as Ru, Ta, Ti, Ir, or a Ru/Ta/Ru, Ru/Ti/Ru, or Cu/Ru/Ta trilayer.

In the presence of an external magnetic field in the range of interest, i.e., magnetic fields from recorded data on the disk, the magnetization direction 111 of free layer 110 will rotate while the magnetization direction 121 of reference layer 120 will remain fixed and not rotate. Thus when a sense current $I_S$ is applied from top shield S2 perpendicularly through the sensor stack to bottom shield S1 (or from S1 to S2), the magnetic fields from the recorded data on the disk will cause rotation of the free-layer magnetization 111 relative to the reference-layer magnetization 121, which is detectable as a change in electrical resistance.

A ferromagnetic biasing layer 115, such as a CoPt or CoCrPt hard magnetic bias layer, is also typically formed outside of the sensor stack near the side edges 102, 104 of the sensor 100. The biasing layer 115 is electrically insulated from side edges 102, 104 of sensor 100 by insulating layer 116. A capping layer 118, such as layer of Cr, or a multilayer of Ta/Cr is deposited on top of the biasing layer 115. The upper layer of capping layer 118, for example Cr, also serves the purpose as a chemical-mechanical-polishing (CMP) stop layer during fabrication of the sensor. The biasing layer 115 has a magnetization 117 generally parallel to the ABS and thus longitudinally biases the magnetization 111 of the free layer 110. Thus in the absence of an external magnetic field its magnetization 117 is parallel to the magnetization 111 of the free layer 110.

Figure 5:
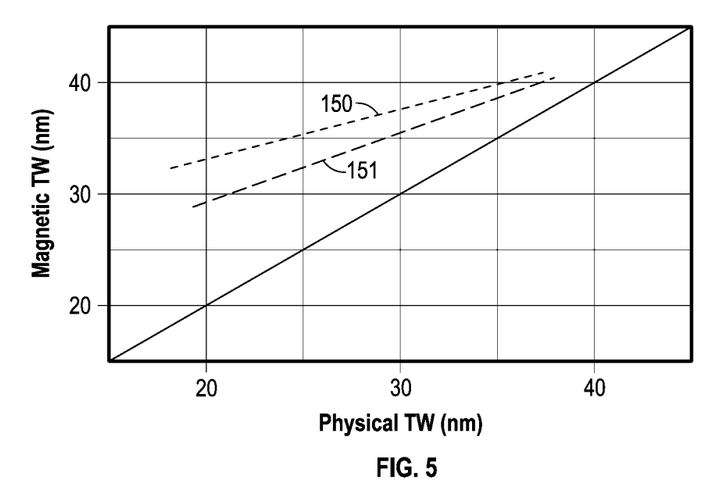
FIG. 5 is a graph of modeling data of magnetic track width (TW) versus physical TW for a conventional CPP-MR read head with hard bias stabilization and a CPP-MR head with side shield stabilization according to the invention.

One problem that arises in CPP-MR sensors is that as the data density increases in magnetic recording disk drives, there is a requirement for a decrease in the read head dimensions, more particularly the TW. However, the effective or "magnetic" TW is generally wider than the physical TW. The magnetic TW decreases at a lower rate than the physical TW because of side reading of data bits from adjacent tracks and the head-to-media spacing. This is shown by line 150 in FIG. 5, which shows modeling data for a sensor with hard bias stabilization. For example, a magnetic TW of about 40 nm can be achieved with a physical TW of about 35 nm. However, to reduce the magnetic TW by 5 nm, to about 35 nm, the physical track width must be reduced by 10 nm, to about 25 nm. This effect is due to the sensor being more sensitive to magnetic fields from data bits in adjacent tracks as the physical TW is made smaller.

To address this problem, sensors with side shields of soft magnetically permeable material have been proposed to address this problem. The hard magnetic biasing material (layer 115 in FIG. 4) is replaced with soft magnetically permeable material like NiFe. For a given physical TW a smaller magnetic TW is achieved for a sensor with side shield stabilization as compared to a sensor with hard bias stabilization, as shown by line 151 as compared to line 150 in FIG. 5. In particular, the magnetic track width is 2-3 nm smaller for the sensor with side shields compared to a sensor with conventional hard bias stabilization for sensors with a physical track width between 20 and 35 nm. However, because the NiFe does not have sufficient magnetization to adequately bias the magnetization of the free layer, alternative techniques to magnetically stabilize the free layer have been proposed. One technique is "in-stack" biasing. Haginoya et al., "Side-Shielded Tunneling Magnetoresistive Read Head for High-Density Recording", *IEEE Transactions on Magnetics*, Vol. 40, No. 40, July 2004, pp. 2221-2223 and US2011/0051291 A1 disclose sensors with side shields and in-stack flux-closure biasing structures. Another technique, as described in U.S. application Ser. No. 13/664,277 filed Oct. 30, 2012 and assigned to the same assignee as this application, uses exchange-coupled side shields that also provide longitudinal biasing of the free layer to stabilize the magnetization of the free layer.

Another problem that arises in CPP-MR sensors is that in each shield S1, S2 there can be a large number of magnetic domains separated from each other by domain walls. Each domain typically has a magnetization oriented in a direction different from the magnetization of adjacent domains. The application of an external magnetic field, such as from an adjacent track or adjacent bits in the track being read, can cause the domain walls to move. Because of the random nature of the domain wall location, the domain walls generally do not return to their original location after the external magnetic field is removed. The domains in the shields exert stray magnetic fields on the sensor and therefore affect the magnetic bias point of the sensor. As the domain walls move, these stray magnetic fields change, thus changing the bias point of the sensor, and thereby the response of the sensor to signals emanating from the disk. The overall result is undesirable noise during the read operation.

Figure 6:
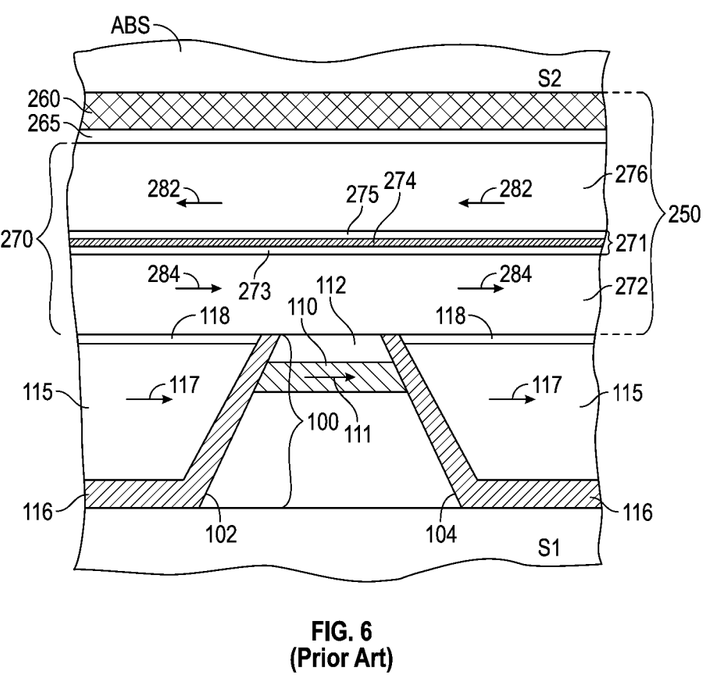
FIG. 6 is a cross-sectional schematic view of a CPP-MR read head according to the prior art with hard bias stabilization of the free layer and an antiparallel structure (APS) top shield.

To address this problem, sensors with an antiparallel structure (APS) top shield have been proposed, for example as described in US 2009/0279213 A1. FIG. 6 is a sectional view of sensor 100 with a top shield formed as an APS 250. The APS 250 is an antiferromagnetically exchange-coupled top shield that includes a well-known antiparallel (AP) coupled structure 270 and antiferromagnetic (AF) layer 260. AP-coupled structure 270 includes soft magnetic layers 272, 276 separated by an antiparallel-coupling structure 271. Layers 272, 276 are formed of soft magnetic material with high permeability (greater than 1000) such as NiFe$_x$, where x is greater than or equal to 15 atomic percent and less than or equal to 25 atomic percent. The antiparallel coupling structure 271 includes nonmagnetic antiparallel coupling (APC) film 274, typically Ru, Ir or Cr, with two interface films 273, 275 of Co or CoFe sandwiching APC film 274. The upper layer 276 is exchange-coupled to AF layer 260 and thus has its magnetization 282 pinned by AF layer 260. An optional coupling layer 265, for example a 1-2 nm Co or CoFe alloy, may be deposited on layer 276 to improve exchange coupling of layer 276 by AF layer 260. The lower layer 272 is AP coupled to upper layer 276 across antiparallel-coupling structure 271 and has a magnetization 284 antiparallel to magnetization 282. The APS structure 250 is located on the sensor 100 and the hard biasing cap layers 118 on the two sides of sensor 100. The non-magnetic hard-biasing cap layer 118, for example a Ta/Cr bilayer, magnetically separates the hard-biasing layer 115 and the APS structure 250. The antiferromagnetically exchange-coupled top shield structure 250 functions as an along-the-track top shield, so the conventional plated top shield S2 is not required, but may optionally be retained on top of structure 250, for example to facilitate the conventional ABS processing. For this a nonmagnetic decoupling layer may be inserted between the AF layer 260 and the plated shield to magnetically decouple the APS from the plated shield. The AF layer 260 is preferably IrMn (where Mn is between 70 and 85 atomic percent), or any other known AF material, like PtMn, NiMn, FeMn, PdMn, PtPdMn, or RhMn.

Figure 7:
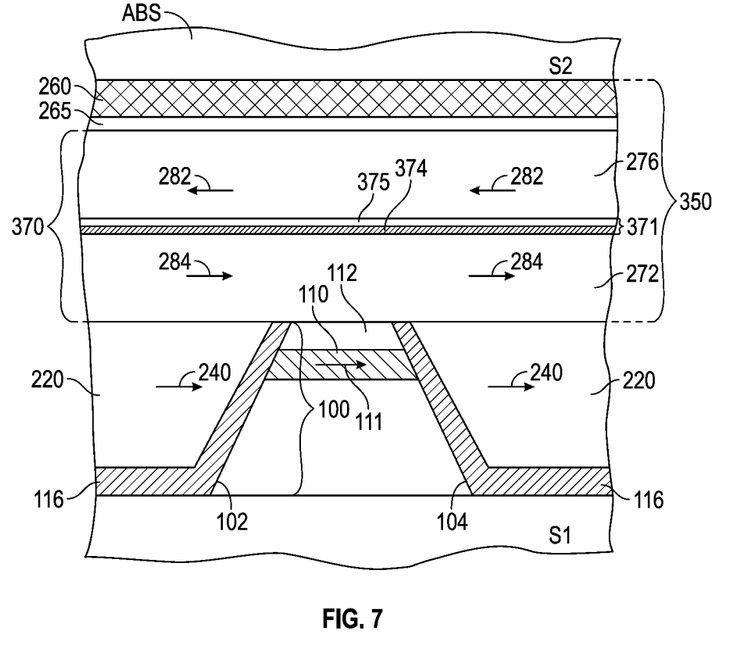
FIG. 7 is a cross-sectional schematic view of the CPP-MR read head according to an embodiment of the invention with side shields and an APS top shield having only one interface layer adjacent the antiparallel coupling (APC) layer.

In an embodiment of this invention the CPP-MR sensor includes both side shields and an APS top shield. However, the APS top shield differs from the prior art APS top shield of FIG. 6, which enables the material of the side shields to be optimized for both side shielding and stabilization of the free layer. Referring to FIG. 7, the sensor 100 includes two side shields 220 with magnetization 240. The sensor 100 is located on a central region of a substrate, in this example an along-the-track shield 51, with side shields 220 on side regions of S1. The APS top shield 350 is located above sensor 100 and side shields 220, with lower layer 272 being in contact with and magnetically exchange-coupled to side shields 220.

Side shields 220 are formed of "soft" magnetic material, i.e., material that can be easily magnetized and demagnetized at low magnetic fields. The preferred material for side shields 220 is preferably an alloy comprising Ni and Fe with permeability ($\mu$) preferably greater than 1000. The side shields 220 should also have a low easy-axis and hard axis coercivity, less than 5 Oe for easy axis and less than 2 Oe for hard axis, and a saturation magnetization $M_s$ greater than or equal to 700 emu/cm$^3$ and less than or equal to 900 emu/cm$^3$. Specific compositions include NiFe$_x$, where x is between 15 and 25 atomic percent. These compositions enable adequate longitudinal biasing of the free layer 110 to provide stabilization of the free layer magnetization 111. Also, these compositions have a low magnetostriction, which is desirable to reduce noise in the sensor and high permeability, which is desirable for good shielding.

However, as part of the development of this invention, it was discovered that when the APS top shield 250 of FIG. 6 was used with the above-described preferred side shields, the free layer 110 became over-stabilized, i.e., the side shields provided too strong of a biasing field to the free layer 110 so that the free layer magnetization 111 could not properly rotate in the presence of magnetic fields from the recorded data on the disk. To compensate for this, the side shields were formed of Ni$_{96}$Fe$_4$, which has a low $M_s$ of 550 emu/cm$^3$ compared to 820 emu/cm$^3$ for Ni$_{81}$Fe$_{19}$, and therefore provides a lower biasing field than Ni$_{81}$Fe$_{19}$ of the same thickness. However, Ni$_{96}$Fe$_4$ is a less desirable material to use due to its low permeability and high negative magnetostriction. In particular, Ni$_{96}$Fe$_4$ has a permeability $\mu$ of 300 compared to 2000 for Ni$_{81}$Fe$_{19}$, and a magnetostriction approximately 20 times higher than that of Ni$_{81}$Fe$_{19}$. Thus the prior art APS top shield 250 of FIG. 6 could not be successfully used with side shields having the preferred material composition of NiFe$_x$, where x is between 15 and 25 atomic percent.

In the embodiment of the invention of FIG. 7, the APS top shield 350 includes an antiparallel (AP) coupled structure 370 with an antiparallel-coupling structure 371 that permits the use of the desired NiFe$_x$ material for the side shields, where x is between 15 and 25 atomic percent, without the problem of over-stabilization of the free layer magnetization 111. The APS top shield 350 includes lower and upper layers 272, 276, respectively, with respective antiparallel magnetizations 284, 282, AF layer 260 and optional coupling layer 265, all as described above in FIG. 6. However, in the APS top shield 350, the antiparallel-coupling structure 371 includes an APC film 374, typically 5-10 Å of Ru, Ir or Cr, and one and only one interface film 375 of Co or CoFe. In the preferred embodiment of antiparallel-coupling structure 371 the APC film 374 is in contact with lower layer 272 and the one interface film 375 of Co or CoFe is between APC film 374 and upper layer 276. In an alternative embodiment the one and only one interface film 375 may be located between lower layer 272 and APC film 374, with APC film 374 in contact with upper layer 276.

Table 1 is a list values of H$_{95}$ from measured M-H loops for top shield APS structures with various antiparallel coupling (APC) structures. H$_{95}$ is the applied field required to achieve 95% of the saturation magnetization $M_s$. The $M_s$ for the APS top shields in Table 1 was approximately 820 emu/cm$^3$.

TABLE 1

| APS lower layer | APC structure in APS top shield | APS upper layer | H$_{95}$ (Oe) |
|---|---|---|---|
| 300Å Ni$_{81}$Fe$_{19}$ | 8Å Co/7.8Å Ru/8Å Co | 230Å Ni$_{81}$Fe$_{19}$ | 1200 |
| 300Å Ni$_{81}$Fe$_{19}$ | 0Å Co/7.8Å Ru/8Å Co | 230Å Ni$_{81}$Fe$_{19}$ | 450 |
| 300Å Ni$_{81}$Fe$_{19}$ | 8Å Co/7.8Å Ru/0Å Co | 230Å Ni$_{81}$Fe$_{19}$ | 625 |
| 300Å Ni$_{81}$Fe$_{19}$ | 0Å Co$_{75}$Fe$_{25}$/7.8Å Ru/8Å Co$_{75}$Fe$_{25}$ | 230Å Ni$_{81}$Fe$_{19}$ | 425 |

While data was not obtained for an APC structure of [8 Å Co$_{75}$Fe$_{25}$/7.8 Å Ru/0 Å Co$_{75}$Fe$_{25}$], it is estimated that the value of H$_{95}$ for an APS top shield with such an APC structure would be between about 550 and 600 Oe.

An estimated permeability of the APS top shield can be given by the following:

$$\mu = 4\pi M_s / H_{95} \quad \text{(Equation 1)}$$

From this equation and from the data in Table 1 it can be seen that APS top shields with APC structures having only one Co or CoFe interface layer have lower values of H$_{95}$ and thus higher permeability, which is desirable for the top shield.

Figure 8:
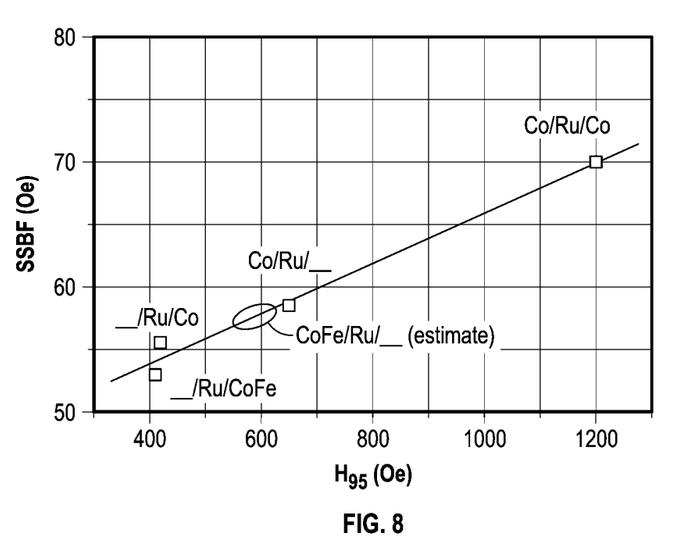
FIG. 8 is a graph of the side shield biasing field (SSBF) for the preferred $Ni_{81}Fe_{19}$ side shields as a function of the $H_{95}$ value for various APS top shields.

As explained above and shown in FIG. 7, the lower layer 272 of the APS structure 350 is exchange coupled to the side shields 220. The value of H$_{95}$ for the APS top shield has been shown to correlate with the strength of the biasing field that the side shields 220 apply to the free layer 110. FIG. 8 is a graph of the side shield biasing field (SSBF) for the preferred Ni$_{81}$Fe$_{19}$ side shields as a function of the H$_{95}$ value for various APS top shields. The APS top shield with an APC structure of [8 Å Co/7.8 Å Ru/8 Å Co] causes the exchange-coupled Ni$_{81}$Fe$_{19}$ side shields to generate an SSBF of 70 Oe, which is too high and results in over-stabilization of the free layer. Such an APS top shield would only function without over stabilizing the free layer if the side shields were formed of less desirable material, such as Ni$_{96}$Fe$_4$. In contrast, all of the APS top shields with APC structures that have only one Co or CoFe interface layer cause the exchange coupled Ni$_{81}$Fe$_{19}$ side shields to generate an SSBF of less than 58 Oe, which is acceptable and does not result in over stabilization of the free layer. The lowest value of SSBF is achieved with an APC structure where the only interface layer is Co$_{75}$Fe$_{25}$ and is located above the APC layer. The next lowest value of SSBF is achieved with an APC structure where the only interface layer is Co and is located above the APC layer. Thus the preferred embodiment is as depicted in FIG. 7, where the one and only one Co or $Co_{75}Fe_{25}$ interface film 375 is located between the APC film 374 and the upper layer 276.

The Co or CoFe interface layer may have a thickness in the range of 2 to 12 Å. If CoFe is used as the only interface layer, the preferred composition is $CoFe_x$, where x is between about 10 and 40 atomic percent. It has been shown that as the amount of Fe in the CoFe interface layer increases, the value of $H_{95}$ decreases.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive sensor structure for sensing magnetically recorded data from a magnetic recording medium, the structure comprising:
    a substrate;
    a magnetoresistive sensor comprising a stack of layers including a ferromagnetic free layer on a central region of the substrate and having a front edge for facing a magnetic recording medium and two spaced-apart side edges, the sensor being capable of sensing magnetically recorded data when a sense current is applied perpendicular to the planes of the layers in the sensor stack;
    a side shield on each of two side regions of the substrate adjacent said central region of the substrate, each side shield formed of an alloy comprising Ni and Fe wherein the amount of Fe is greater than or equal to 15 atomic percent and less than or equal to 25 atomic percent of the total of Ni and Fe in said alloy, each side shield having its magnetization oriented generally parallel to said sensor front edge and generally parallel to the plane of said free layer; and
    a top shield on the sensor and the two side shields comprising an antiparallel structure (APS) having first and second ferromagnetic layers, a nonmagnetic antiparallel coupling (APC) film between said first and second ferromagnetic layers that couples said first and second ferromagnetic layers together antiferromagnetically, and one and only one ferromagnetic interface film between and in contact with said APC film and one and only one of said APS first and second ferromagnetic layers, the interface film selected from Co and a CoFe alloy.

2. The sensor structure of claim 1 wherein said interface film consists of Co.

3. The sensor structure of claim 1 wherein said interface film is located between and in contact with said APC film and the upper of said APS first and second ferromagnetic layers.

4. The sensor structure of claim 1 wherein each side shield has a saturation magnetization greater than or equal to 700 $emu/cm^3$ and less than or equal to 900 $emu/cm^3$, an easy-axis coercivity less than 5 Oe and a hard axis coercivity less than 2 Oe.

5. The sensor structure of claim 1 wherein each side shield has a permeability greater than 1000.

6. The sensor structure of claim 1 further comprising an electrically insulating layer between each side shield and a sensor side edge.

7. The sensor structure of claim 1 wherein the lower of said APS first and second ferromagnetic layers is in contact with and exchange coupled to each side shield.

8. The sensor structure of claim 1 wherein each of said APS first and second ferromagnetic layers is formed of an alloy selected from $NiFe_x$, where the subscripts are in atomic percent, where x is greater than or equal to 15 and less than or equal to 25.

9. The sensor structure of claim 1 wherein each of said APS first and second ferromagnetic layers has a permeability greater than 1000.

10. The sensor structure of claim 1 wherein said APC film is selected from Ru, Ir and Cr.

11. The sensor structure of claim 1 further comprising an antiferromagnetic layer on the upper of said APS first and second ferromagnetic layers.

12. The sensor structure of claim 10 further comprising an electroplated shield layer on said antiferromagnetic layer.

13. The sensor structure of claim 1 wherein said substrate comprises a bottom shield formed of magnetically permeable material.

14. A current-perpendicular-to-the-plane magnetoresistive sensor structure comprising:
    a substrate;
    a magnetoresistive sensor comprising a stack of layers including a ferromagnetic free layer on a central region of the substrate and having a front edge and two spaced-apart side edges;
    a side shield on each of two side regions of the substrate adjacent said central region of the substrate, each side shield having its magnetization oriented generally parallel to said sensor front edge and generally parallel to the plane of said free layer, each side shield formed of an alloy selected from $NiFe_x$, where the subscripts are in atomic percent and where x is greater than or equal to 15 and less than or equal to 25; and
    a top shield on and exchange coupled with the two side shields, the top shield comprising an antiparallel structure (APS) having lower and upper ferromagnetic layers having antiparallel magnetizations, a nonmagnetic antiparallel coupling (APC) film between said lower and upper ferromagnetic layers that couples said lower and upper ferromagnetic layers together antiferromagnetically, one and only one ferromagnetic interface film between and in contact with said APC film and one and only one of said APS lower and upper ferromagnetic layers, the interface film selected from Co and a CoFe alloy, and an antiferromagnetic layer exchange coupled with said upper ferromagnetic layer.

15. The sensor structure of claim 14 wherein said interface film consists of Co.

16. The sensor structure of claim 14 wherein said interface film is located between and in contact with said APC film and said upper ferromagnetic layer of said APS.

17. The sensor structure of claim 14 further comprising an electrically insulating layer between each side shield and a sensor side edge.

18. The sensor structure of claim 14 wherein each of said APS lower and upper ferromagnetic layers is formed of an alloy selected from $NiFe_x$, where the subscripts are in atomic percent and where x is greater than or equal to 15 and less than or equal to 25.

19. The sensor structure of claim 14 wherein said APC film is selected from Ru, Ir and Cr.

20. The sensor structure of claim 14 further comprising a coupling layer selected from Co and CoFe between said antiferromagnetic layer and said upper ferromagnetic layer.

21. The sensor structure of claim 14 further comprising an electroplated shield layer on said antiferromagnetic layer.

22. The sensor structure of claim 14 wherein said substrate comprises a bottom shield formed of magnetically permeable material.

* * * * *